(12) United States Patent
Thomas et al.

(10) Patent No.: US 11,353,118 B2
(45) Date of Patent: *Jun. 7, 2022

(54) LEAK RESISTANT AND SERVICEABLE RECEPTACLE

(71) Applicant: Engineered Controls International, LLC, Elon, NC (US)

(72) Inventors: Chad Thomas, Summerfield, NC (US); Michael T. Glavin, Summerfield, NC (US); Jeffrey S. Howard, Elon, NC (US); Guangbin Cao, Shanghai (CN)

(73) Assignee: Engineered Controls International, LLC, Elon, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/131,214

(22) Filed: Dec. 22, 2020

(65) Prior Publication Data

US 2021/0108732 A1 Apr. 15, 2021

Related U.S. Application Data

(63) Continuation of application No. 15/986,541, filed on May 22, 2018, now Pat. No. 10,876,636, which is a
(Continued)

(51) Int. Cl.
*F16K 1/46* (2006.01)
*F16L 37/40* (2006.01)
(Continued)

(52) U.S. Cl.
CPC .............. *F16K 1/465* (2013.01); *F16K 1/126* (2013.01); *F16K 1/422* (2013.01); *F16K 15/063* (2013.01);
(Continued)

(58) Field of Classification Search
CPC . F16K 1/42; F16K 1/422; F16K 1/425; F16K 1/427; F16K 1/46; F16K 1/465;
(Continued)

(56) References Cited

U.S. PATENT DOCUMENTS 2,322,139 A    6/1943 Kaelin
2,706,646 A *  4/1955 Olson .................. F16L 37/23
                                               137/614.04
(Continued)

FOREIGN PATENT DOCUMENTS

AT    302757       10/1972
AT    302757 B  * 10/1972  ............. F16K 1/422
(Continued)

OTHER PUBLICATIONS

50 GPM LNG Receptacle Seal Repair Kit Instruction Sheet, Macro Technologies, LLC, Oct. 30, 2013.
(Continued)

*Primary Examiner* — David Colon-Morales
(74) *Attorney, Agent, or Firm* — Neal, Gerber & Eisenberg LLP

(57) ABSTRACT

A receptacle for conveying fluid is disclosed. An example receptacle includes a main body defining an inlet and an outlet, a spring retainer disposed in the main body, a valve seat disposed in the main body, and a poppet configured to slide between a closed position and an open position. The poppet is slidably engaged with the spring retainer between the closed position and the open position and is engaged with the valve seat in the closed position. The example receptacle also includes a spring engaged with the spring retainer and the poppet to bias the poppet to engage the valve seat in the closed position. The spring retainer, the valve seat, the poppet, and the spring are removable from the main body via the inlet without disassembling the main body.

19 Claims, 11 Drawing Sheets

Related U.S. Application Data continuation-in-part of application No. 15/368,440, filed on Dec. 2, 2016, now Pat. No. 10,184,569.

(60) Provisional application No. 62/262,694, filed on Dec. 3, 2015.

(51) Int. Cl.
*F16K 15/06* (2006.01)
*F16K 1/42* (2006.01)
*F16K 1/12* (2006.01)

(52) U.S. Cl.
CPC ........ *F16L 37/40* (2013.01); *F17C 2205/037* (2013.01); *F17C 2205/0335* (2013.01); *F17C 2221/011* (2013.01); *F17C 2221/014* (2013.01); *F17C 2221/033* (2013.01); *F17C 2223/0123* (2013.01); *F17C 2223/0161* (2013.01); *F17C 2265/065* (2013.01)

(58) Field of Classification Search
CPC . F16L 37/30; F16L 37/42; F16L 37/38; F16L 37/40; Y10T 137/87925; Y10T 137/87941; Y10T 137/87949; Y10T 137/87957; F17C 2223/0161; F17C 2223/0153; F17C 2223/0123; F17C 2221/033; F17C 2205/0323; F17C 2205/0329; F17C 2205/0335; F17C 2205/037; F17C 2205/0382
See application file for complete search history.

(56) References Cited

U.S. PATENT DOCUMENTS

| | | | |
|---|---|---|---|
| 2,819,868 A | | 1/1958 | Cauffman |
| 2,823,048 A | | 2/1958 | Hansen |
| 3,131,906 A | | 5/1964 | King |
| 3,524,469 A | | 8/1970 | Jebe |
| 3,542,063 A | | 11/1970 | McKinney et al. |
| 3,746,305 A | | 7/1973 | Zakka |
| 3,755,876 A | | 9/1973 | Beasley |
| 3,842,614 A | | 10/1974 | Karcher et al. |
| 3,851,666 A | | 12/1974 | Hammond |
| 4,172,469 A | | 10/1979 | Boehringer |
| 4,200,121 A | | 4/1980 | Walter et al. |
| 4,316,598 A | | 2/1982 | Maggio |
| 4,376,526 A | | 3/1983 | Freeman |
| 4,709,726 A | * | 12/1987 | Fitzgibbons .......... E21B 33/038 137/614.04 |
| 4,815,698 A | | 3/1989 | Palmer |
| 4,831,454 A | | 5/1989 | Tanaka et al. |
| 5,052,439 A | * | 10/1991 | Smith, III ................ F16L 1/26 137/614.04 |
| 5,255,699 A | | 10/1993 | Herzan et al. |
| 5,265,844 A | | 11/1993 | Westfall |
| 5,429,155 A | | 7/1995 | Brzyski et al. |
| 5,649,567 A | | 7/1997 | Butler et al. |
| 6,035,894 A | | 3/2000 | Weh et al. |
| 6,145,322 A | | 11/2000 | Odashima |
| 6,189,862 B1 | | 2/2001 | McKay |
| 6,343,630 B1 | | 2/2002 | Dubinsky |
| 6,354,564 B1 | * | 3/2002 | Van Scyoc ............. F16L 37/32 137/614.04 |
| 6,409,150 B2 | | 6/2002 | Sullivan, Sr. et al. |
| 6,659,426 B2 | | 12/2003 | Schroeder et al. |
| 6,752,377 B1 | | 6/2004 | Taylor et al. |
| 6,789,784 B2 | | 9/2004 | Wears et al. |
| 6,886,803 B2 | | 5/2005 | Mikiya et al. |
| 6,892,999 B2 | | 5/2005 | Hall et al. |
| 6,908,070 B2 | | 6/2005 | Bartos et al. |
| 6,945,477 B2 | | 9/2005 | Lambert et al. |
| 7,669,612 B2 | | 3/2010 | Matsumoto |
| 7,874,314 B2 | | 1/2011 | Zuck |
| 8,087,642 B2 | | 1/2012 | Lucas |
| 8,413,955 B1 | | 4/2013 | Rooney |
| 8,899,256 B2 | * | 12/2014 | Krohn ..................... F16L 37/30 137/15.18 |
| 9,194,524 B2 | | 11/2015 | Konishi |
| 9,664,319 B2 | | 5/2017 | Weiland et al. |
| 10,184,569 B2 | | 1/2019 | Thomas et al. |
| 10,876,636 B2 | * | 12/2020 | Thomas ................... F16L 37/40 |
| 2002/0079473 A1 | | 6/2002 | Jeory |
| 2004/0075072 A1 | | 4/2004 | Lanting et al. |
| 2005/0001194 A1 | | 1/2005 | Bachelder |
| 2006/0027771 A1 | | 2/2006 | Baumann |
| 2009/0091129 A1 | | 4/2009 | Moriiki et al. |
| 2010/0236533 A1 | | 9/2010 | Meldolesi et al. |
| 2010/0264343 A1 | | 10/2010 | Jeory |
| 2013/0341906 A1 | * | 12/2013 | Lehmann ................ F16L 37/24 285/33 |
| 2016/0061341 A1 | | 3/2016 | Broschka et al. |
| 2016/0312939 A1 | | 10/2016 | Konishi |
| 2017/0159886 A1 | | 6/2017 | Thomas et al. |

FOREIGN PATENT DOCUMENTS

| | | |
|---|---|---|
| DE | 2016850 | 10/1971 |
| DE | 9209236 | 9/1992 |
| FR | 76801 | 12/1961 |
| WO | WO2017096306 | 6/2017 |

OTHER PUBLICATIONS

CryoMac2 LNG Quick Connect Nozzle User's Manual and Installation Guide, Macro Technologies, LLC, Nov. 25, 2013.

Cryomac2, 50 GPM, Manual, Macro Technologies, LLC, Sep. 4, 2013.

Extended European Search Report for European Patent Application No. 18185587.5 dated Feb. 5, 2019.

International Search Report and Written Opinion for PCT/US2016/064828 dated Apr. 4, 2017.

Male QDV Installation Instructions/Specifications, Macro Technologies, LLC, Dec. 2, 2013.

Office Action for Chinese Patent Application No. 201680003511.6 dated Aug. 2, 2018.

QDV, Male, Receptacle, Fueling, M30 Thread, Metric Tube Fitting Information Sheet, Macro Technologies, LLC, Jan. 19, 2011.

U.S. Appl. No. 15/368,360, filed Dec. 2, 2016.

* cited by examiner

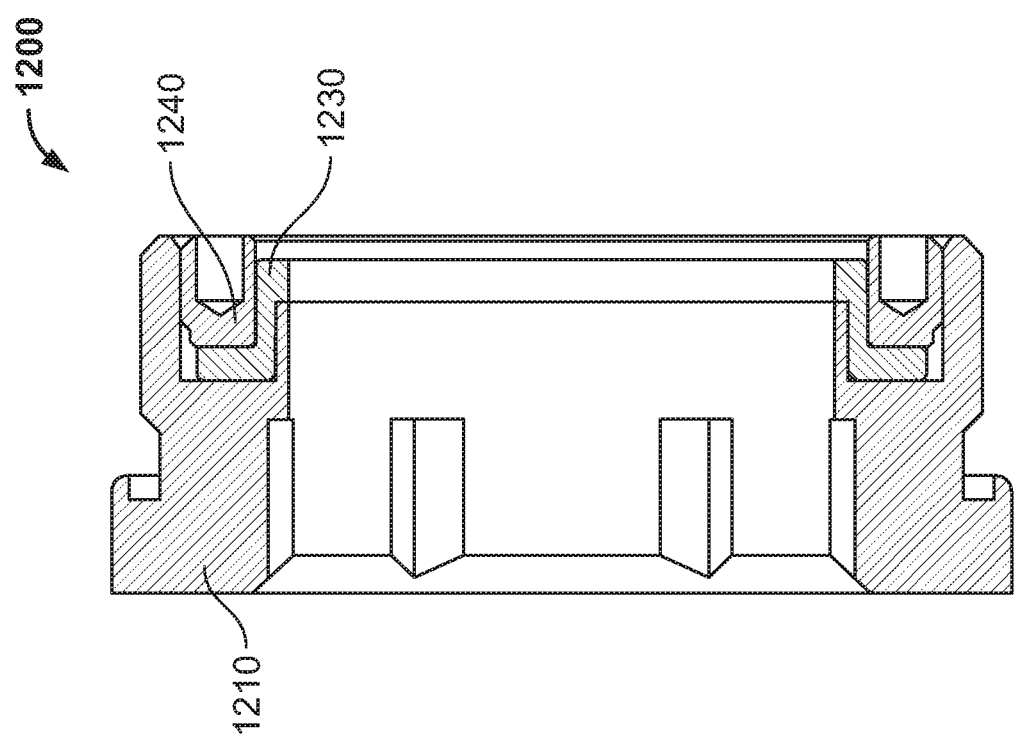

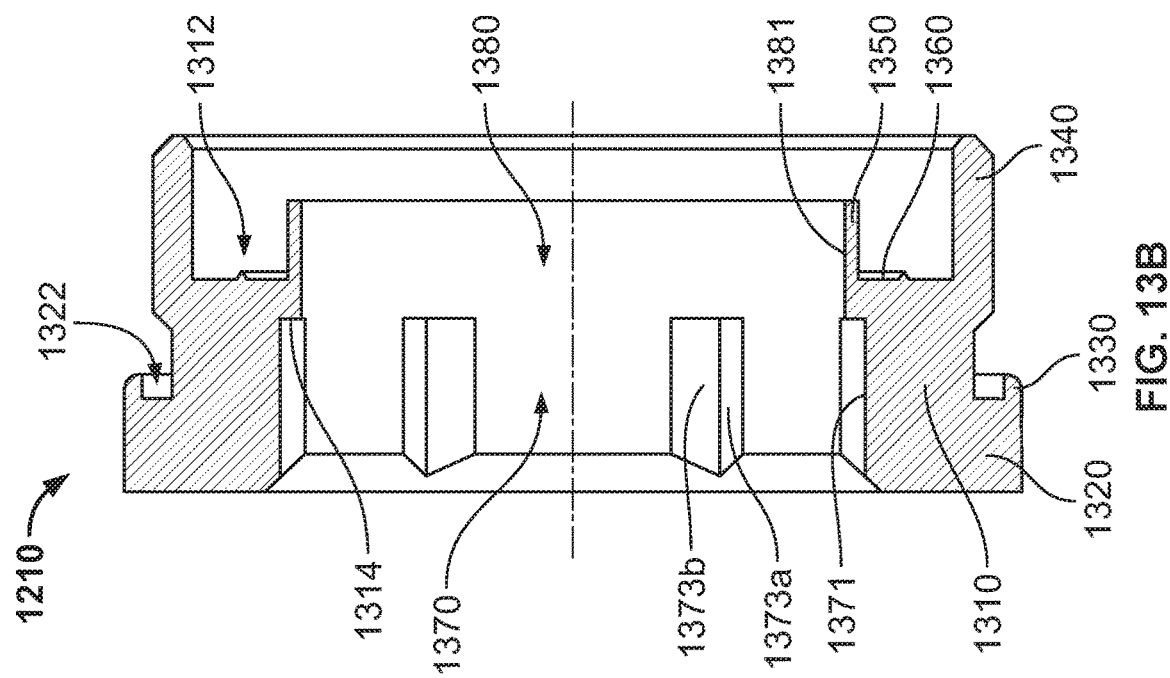
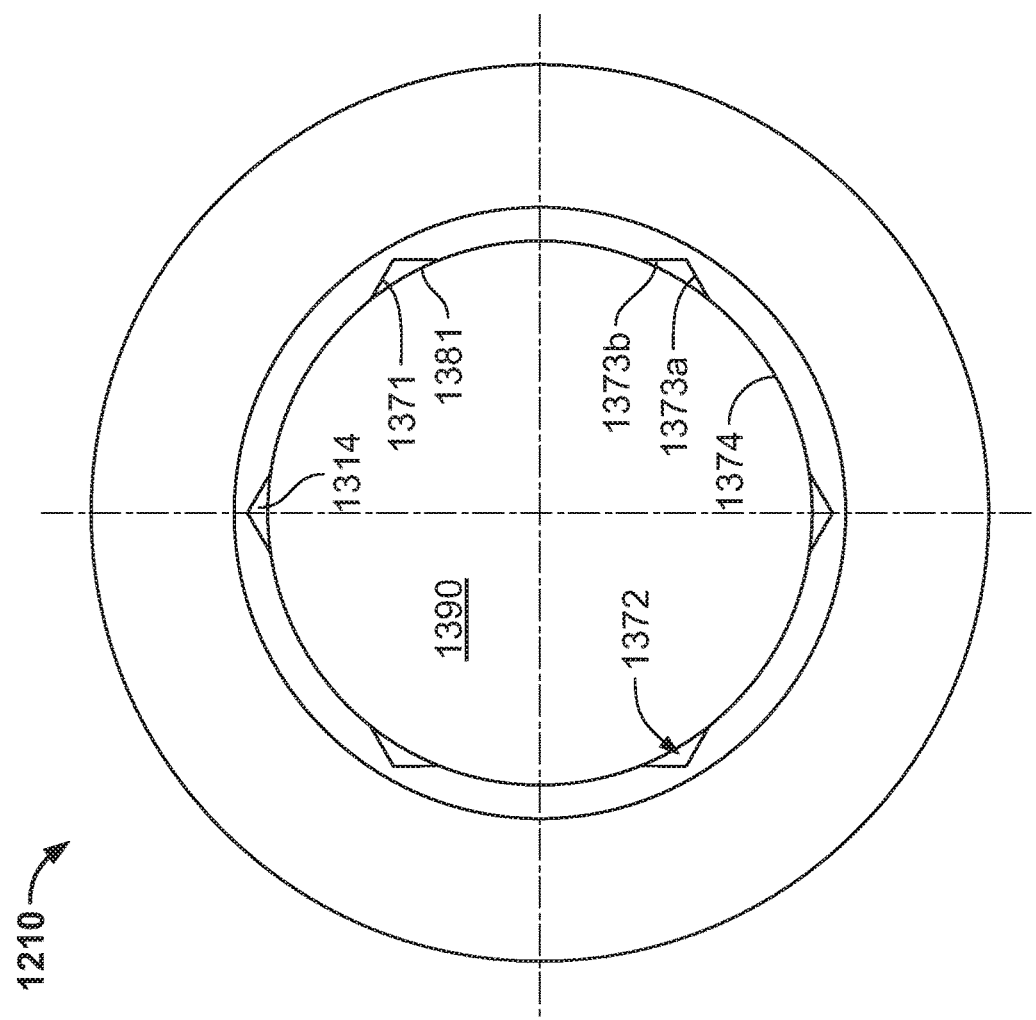
FIG. 13B
FIG. 13A

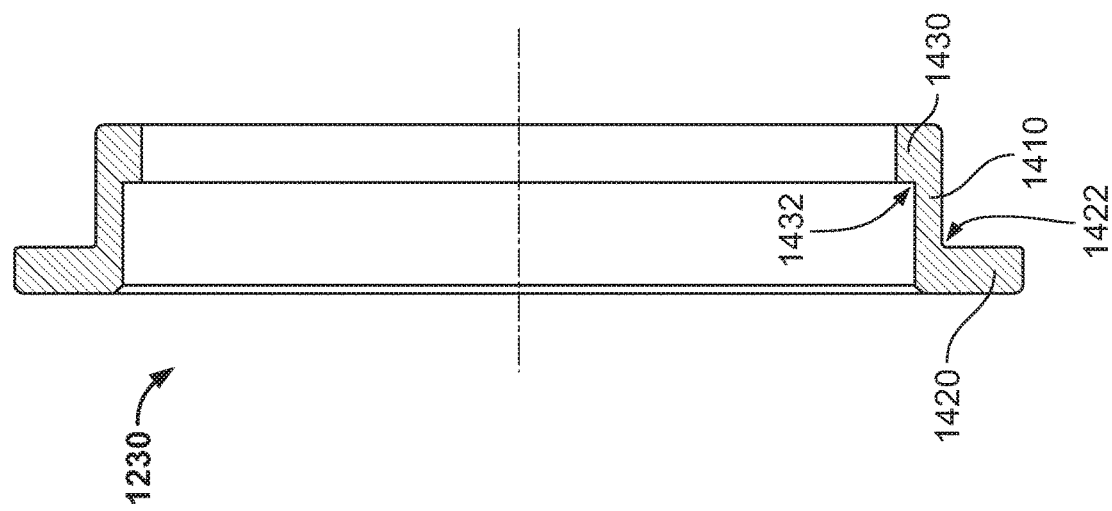

LEAK RESISTANT AND SERVICEABLE RECEPTACLE

CROSS-REFERENCE

This application is a continuation of U.S. patent application Ser. No. 15/986,541, filed on May 22, 2018, which is a continuation-in-part of U.S. patent application Ser. No. 15/368,440, now U.S. Pat. No. 10,184,569, filed on Dec. 2, 2016, which claims priority to U.S. Provisional Patent Application No. 62/262,694, filed on Dec. 3, 2015. These prior applications are hereby incorporated by reference in their entireties.

TECHNICAL FIELD

This disclosure generally relates to a low emission receptacle for receiving a fluid such as liquid natural gas (LNG) liquid oxygen (LOX), liquid nitrogen (LN2) compressed natural gas (CNG), etc., from a nozzle. The fluid may be at cryogenic temperatures.

BACKGROUND

Receptacles are designed to receive fluid from nozzles. One example of a receptacle is a car gasoline port. One example of a nozzle is a gasoline dispenser at a gas station. Some fluids, such as liquid natural gas (LNG) or compressed natural gas (CNG) are transferred via specialized nozzles and receptacles.

LNG may be stored in liquid form at cryogenic temperatures (e.g., −150 degrees C. or −238 degrees F.). During the transferring process between nozzle and receptacle, a portion of LNG may heat up and vaporize into gas. This gas expands to occupy all accessible areas of the nozzle and receptacle. When the transferring process is complete, a portion of the vaporized gas will remain in the coupled connection between the nozzle and the receptacle. When the nozzle is eventually disconnected from the receptacle, this remaining gas vents into ambient atmosphere.

CNG may be stored under high pressures. During the transferring process between nozzle and receptacle, CNG may expand and occupy all accessible areas of the nozzle and receptacle. When the transferring process is complete, a portion of the gas will remain in the receptacle. When the nozzle is eventually disconnected from the receptacle, this remaining gas vents into ambient atmosphere. Thus, a new receptacle is needed that reduces the amount of fluid vented into atmosphere when a nozzle disconnects from the receptacle.

FIGS. 1, 1A, and 1B illustrate a prior art receptacle. This receptacle 10 has been sold as the Macro Technologies Model 13990. Receptacle 10 includes a body 1 having a flange 6 and terminating in a fitting 8. A poppet 2 is slidably disposed in body 1. A retainer 4 is held thereon by retaining ring 3, and a seal 5 is mounted to poppet 2. Spring 7 is also disposed inside body 1 and provides a spring force against poppet 2. Such receptacles are used with a nozzle (also called a coupler), as shown in commonly-owned U.S. Pat. No. 9,194,524, the teachings of which are incorporated herein by reference in their entirety.

SUMMARY

Disclosed is a receptacle for conveying fluid. With respect to prior art receptacles, the disclosed receptacles may vent less fluid and be easier to service. The receptacle may include a main body, a valve seat assembly, a poppet, a spring retainer, and a spring. The valve seat assembly may comprise a valve seat body and a packing. The valve seat body may be disposed in and secured to the main body. The valve seat body may include: a first end and an opposing second end. The first end may include a plurality of first inner surfaces defining an inner annular groove. The valve seat body may include a plurality of second inner surfaces defining an inner void. The plurality of second inner surfaces may include one or more arced surfaces and one or more flats or, more generally, any shape suitable for torque application. The packing, which may be referenced as a seal, may be disposed in the inner annular groove.

BRIEF DESCRIPTION OF THE DRAWINGS

FIG. 12 is a cross sectional view of a valve seat assembly of the embodiment shown in FIG. 10.

FIG. 13A is a front view of the valve seat of FIG. 12.

FIG. 13B is a cross sectional view of the valve seat of FIG. 12.

FIG. 14 is a cross sectional view of the seat disc of FIG. 12.

DETAILED DESCRIPTION

Figure 1B:
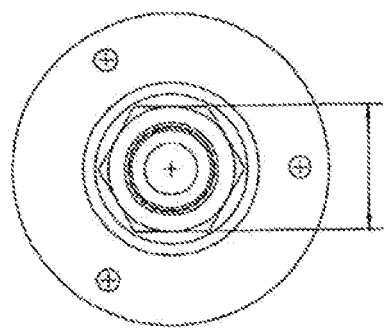
FIG. 1B is a rear end view of the prior art receptacle.

The invention is defined by the appended claims. The description summarizes aspects of some disclosed embodiments and should not be used to limit the claims. Other embodiments are contemplated in accordance with the techniques described herein, as will be apparent upon examination of the following drawings and detailed description, and such embodiments are within the scope of this application.

For a better understanding of the disclosure, reference may be made to embodiments shown in the drawings. The components in the drawings are not necessarily to scale, and related elements may be omitted so as to emphasize and clearly illustrate the novel features described herein. In addition, system components can be variously arranged, as known in the art. In the figures, like referenced numerals may refer to like parts throughout the different figures unless otherwise specified.

While the features, methods, devices, and systems described herein may be embodied in various forms, there are shown in the drawings, and will hereinafter be described, some exemplary and non-limiting embodiments. Not all of the depicted components described in this disclosure may be required, however, and some implementations may include additional, different, or fewer components from those expressly described in this disclosure. Variations in the arrangement and type of the components may be made without departing from the spirit or scope of the claims as set forth herein. This specification is intended to be taken as a whole and interpreted in accordance with the principles of the invention as taught herein and understood by one of ordinary skill in the art.

Some features may be described using relative terms such as top, bottom, vertical, rightward, leftward, etc. It should be appreciated that such relative terms are only for reference with respect to the appended Figures. These relative terms are not meant to limit the disclosed embodiments. More specifically, it is contemplated that the valves depicted in the appended Figures will be oriented in various directions in practice and that the relative orientation of features will change accordingly.

FIGS. 2 to 6 illustrate an exemplary receptacle 100. Receptacle 100 includes a housing 110, valve seat assembly, a poppet or valve seat engager 130, a spring 140, and a spring retainer 150. The valve seat assembly includes a valve seat body 120, a first O-ring or packing 121, and a second O-ring or packing 123. During operation, a nozzle (not shown) may be placed over and around a first portion of body 110 adjacent inlet port 110a. The nozzle may include a poppet, similar to poppet 130, but oriented in the opposite direction (i.e., flipped 180 degrees). The nozzle poppet may contact the surface 131a of poppet 130, causing poppet 130 to slide toward outlet port 110b and disengage from valve seat body 120, thus opening receptacle 100.

After the nozzle is engaged and opened, fluid flows between valve seat body 120 and poppet 130, between body 110 and spring 140, through holes defined in spring retainer 150 and exits through outlet port 110b into a tank (not shown). Engagement between a nozzle and a receptacle is shown in U.S. patent application Ser. No. 15/368,360, which is hereby incorporated by reference in its entirety.

Figure 2:
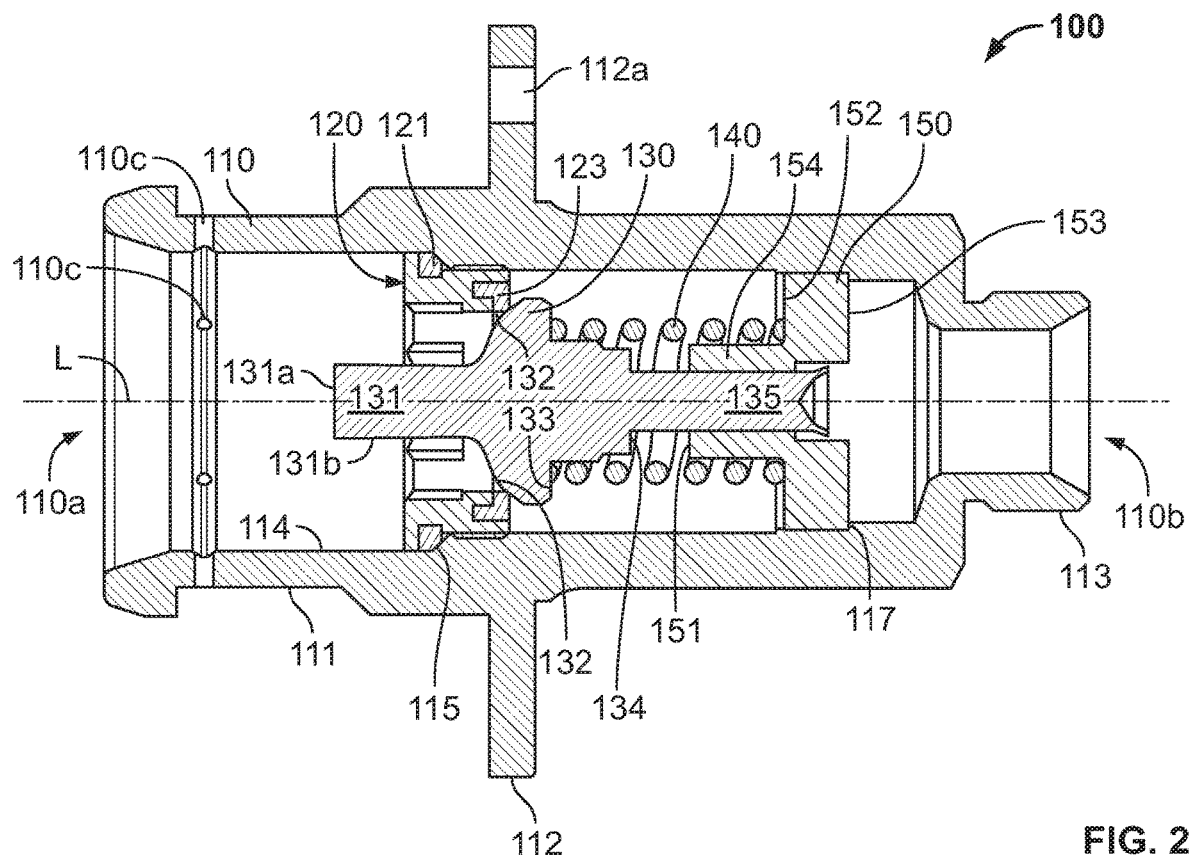
FIG. 2 is a cross-sectional view of a receptacle in accordance with the teachings herein.
Figure 3:
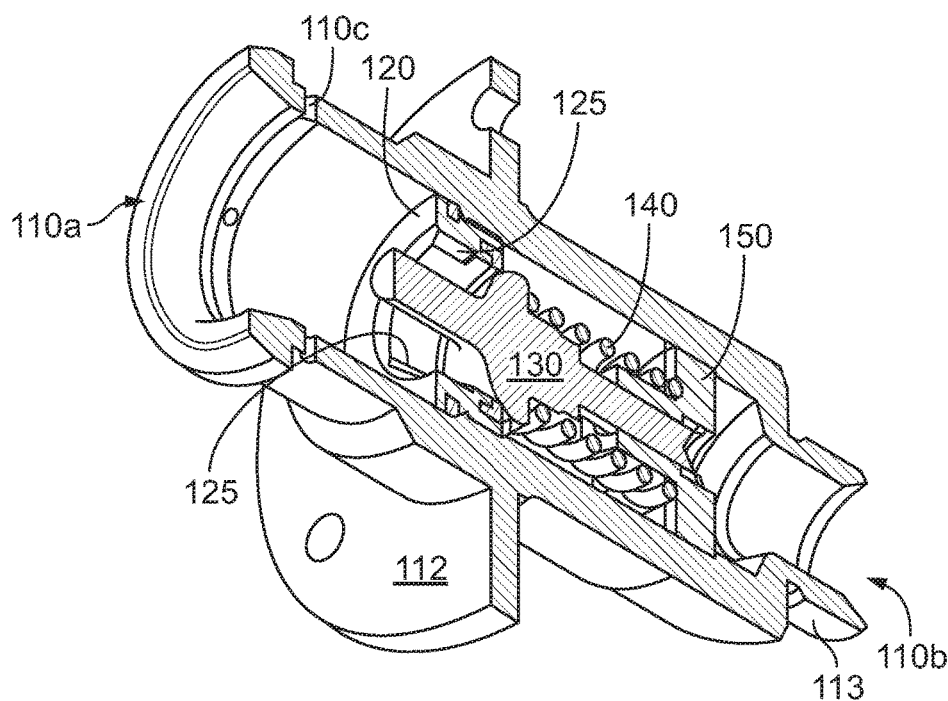
FIG. 3 is an isometric cross sectional view of the receptacle.
Figure 4:
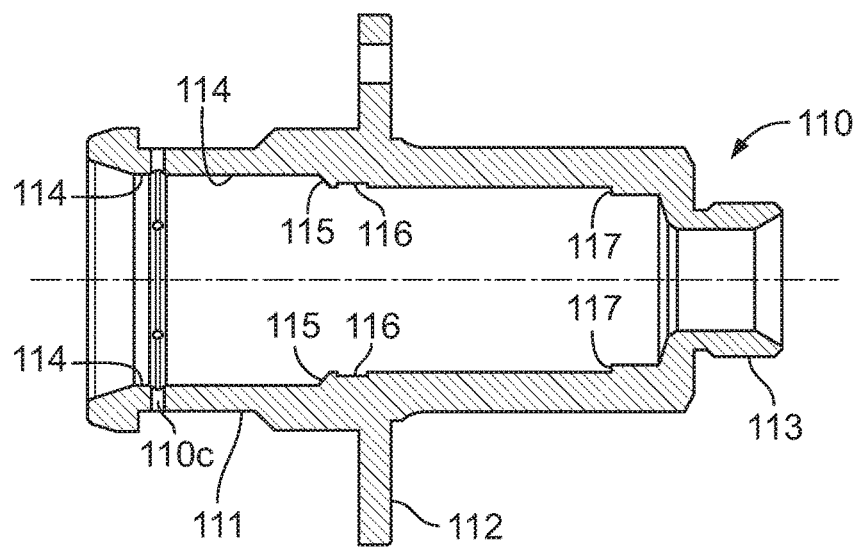
FIG. 4 is cross sectional view of a body of the receptacle.

FIGS. 2, 3, and 4 illustrate an exemplary body 110 (also referred to as a "main body") of receptacle 100. Body 110 defines an inlet port or void 110a, an outlet port or void 110b, and radial venting holes 110c. Body 110 includes an annular recess 111, a radially extending flange 112 defining a plurality of cylindrical holes 112a, a threaded end fitting 113, a cylindrical inner surface 114, a partially conical seating surface 115, inner threads 116, and a step 117.

Annular recess 111 is configured to receive inwardly protruding ball bearings (not shown) connected to the nozzle (not shown). More specifically, a user covers annular recess 111 with the nozzle, which has springs or other members that inwardly bias the ball bearings. When the ball bearings are positioned over annular recess 111, the user releases a sleeve (not shown) retaining the ball bearings, enabling the ball bearings to occupy annular recess 111. While the ball bearings occupy annular recess 111, the nozzle is fixed to receptacle 100, thus preventing an unintended disconnection between the nozzle and receptacle 100.

When the user is finished, the user retracts the ball bearings and pulls the nozzle to away from receptacle 100 until the nozzle no longer covers receptacle 100. Example of ball bearings of a nozzle engaging a receptacle are shown in commonly owned U.S. Pat. No. 9,194,524 to Konishi and U.S. Patent Publication No. 2016/0312939 to Konishi, both of which are hereby incorporated by reference in their entireties.

Radially extending flange 112 has an outer diameter exceeding an inner diameter of the nozzle. Radially extending flange 112 thus prevents a user from covering too much of receptacle 100 with the nozzle (i.e., extending body 110 too far into the nozzle). Clips extending from the nozzle may engage holes 112a, further locking the nozzle with respect to receptacle 100. Threaded end fitting 113 may connect to a threaded conduit (not shown). The threaded conduit may deliver fluid leaving receptacle via outlet port 110b to a tank (not shown). Alternatively, threaded end fitting 113 may directly connect to the tank.

Cylindrical inner surface 114 is generally smooth and configured to engage an O-ring or packing located about an outer diameter of an inwardly protruding member of the nozzle. More specifically, once a user has fixed the nozzle to receptacle 100, the user may slide the inwardly protruding member into inlet port 110a. The inwardly protruding member includes a cylindrical valve seat body somewhat similar to valve seat body 120, but facing in the opposite direction. An O-ring or packing of the inwardly protruding member slides along and compresses against cylindrical inner surface 114. This O-ring or packing prevents fluid from flowing backwards (i.e., to the left in FIG. 2) and escaping into ambient atmosphere via inlet port 110a and/or venting holes 110c.

Partially conical seating surface 115, as shown in FIGS. 2 and 3, compresses first O-ring or packing 121 against valve seat body 120. By virtue of this compression, first O-ring or packing 121 prevents fluid located on the tank side of valve seat body 120 (e.g., fluid near spring 140) from leaking between body 110 and valve seat body 120 when receptacle 100 is closed.

Inner threads 116 engage outer threads 126 of valve seat body 120, thus securing valve seat body 120 with respect to body 110. Step 117 serves as a stop for spring retainer 150. More specifically, step 117 prevents spring 140 from pushing spring retainer 150 toward threaded end fitting 113.

Figure 5:
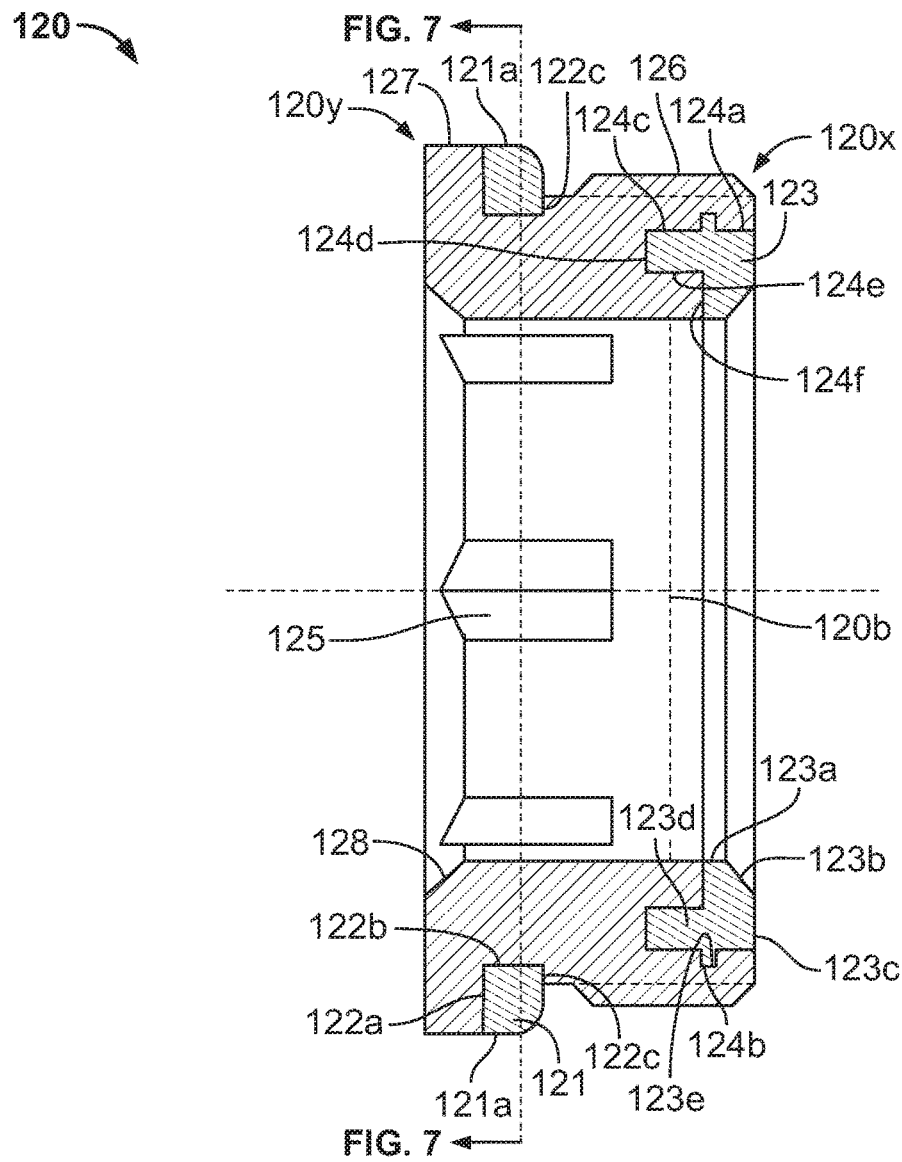
FIG. 5 is a cross sectional view of a valve seat of the receptacle.
Figure 6:
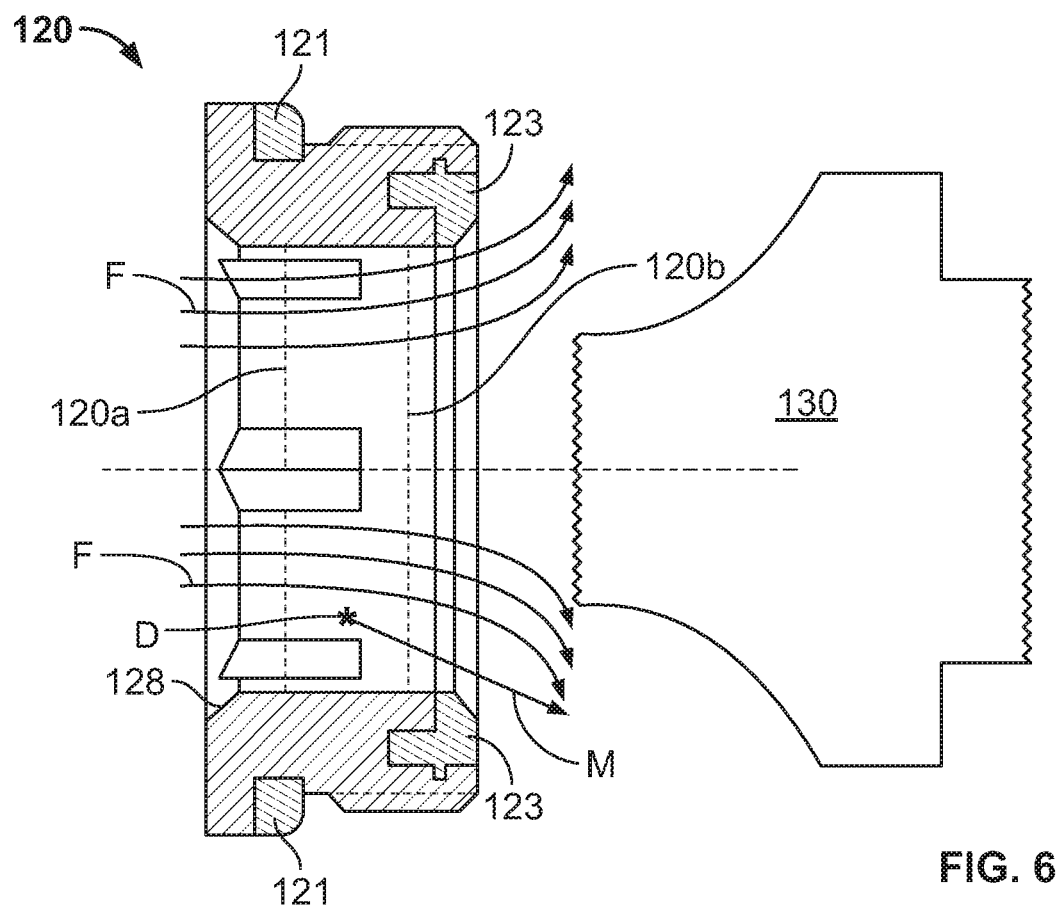
FIG. 6 is a cross sectional view of the valve seat and schematically illustrates a poppet of the receptacle and representative fluid flow.

FIGS. 2, 3, 5, and 6 illustrate an exemplary valve seat body 120. FIG. 6 includes the same view of valve seat body 120 as FIG. 5 and further includes schematic representations of debris D having a momentum vector M, fluid flow F, and poppet 130. Valve seat body 120 includes outer surfaces 122 surrounding first O-ring or packing 121, first inner surfaces 124 surrounding second O-ring or packing 123, second inner surfaces defining a central void, outer threads 126. The second inner surfaces include flats 125. Valve seat body 120 includes a first end portion 120x with an inner annular groove for receiving inner packing 123 and a second opposing end portion 120y with an outer annular groove for receiving outer packing 121.

As previously discussed, packing 121 is compressed between body 110 and valve seat body 120 to prevent fluid leakage between body 110 and valve seat body 120. More specifically, packing 121 is compressed between (a) cylindrical inner surface 114 of body 110, (b) partially conical seating surface 115 of body 110, (c) a ring-shaped first outer ledge surface 122a of valve seat body 120, (d) a cylindrical outer surface 122b of valve seat body 120, and (e) an opposing ring-shaped second outer ledge surface 122c of valve seat body 120.

Surfaces 122a, 122b, 122c (also referred to as outer surfaces) cooperate to define the outer annular groove for receiving outer packing 121. When viewed in cross section, as shown in FIG. 5, surfaces 122a and 122c may be parallel and perpendicular to surface 122b. Surface 122a may have an outer diameter exceeding an outer diameter of surface 122c. Packing 121 may have a flat first surface matching surface 122a, a flat second surface 122b matching surface 122b, and an arced outer surface 121a. Packing 121 may be sized and configured for an interference fit inside of the annular groove defined by surfaces 122a, 122b, 122c.

Second O-ring or packing 123 is fixed, via compression, inside of the inner annular groove defined in valve seat body 120. When receptacle 100 is closed, poppet 130 seals against inner packing 123, thus preventing fluid downstream of valve seat body 120 (e.g., fluid near spring 140) from flowing between poppet 130 and valve seat body 120 and escaping receptacle via inlet port 110a and/or vent holes 110c.

As stated above, valve seat body 120 includes first inner surfaces defining an inner annular groove at first end portion 120x in which inner packing 123 is disposed. These first inner surfaces 124a to 124f include, a cylindrical inner surface 124a and inner surfaces 124b, a cylindrical inner surface 124c, a ring-sixth inner surface 124d, a cylindrical inner surface 124e, and a ring-shaped inner surface 124f. Surfaces 124b define a minor annular inner groove. This annular groove or pocket is L-shaped when viewed in cross section, as shown in FIGS. 5 and 6.

Surfaces 124a to 124f are also referred to as first inner surfaces. Surface 124d is also referred to as a first wall, surface 124c is also referred to as a second wall, surface 124e is also referred to as a third wall. Surfaces 124b are also referred to as fourth, fifth, and sixth walls.

Inner packing 123 may be sized and configured for an interference fit inside the annular inner groove or pocket defined by surfaces 124a to 124e. Such an interference fit binds inner packing 123 in place with respect to valve seat body 120. More specifically, the portion of inner packing 123 located between surfaces 124c and 124e may be wider than the radial distance between surfaces 124c and 124e. As a result, surfaces 124c and 124e discourage packing 123 from moving radially (e.g., toward poppet 130) with respect to valve seat body 120. Surfaces 124d and 124f push packing 123 toward spring 140. Surfaces 124b counter the force exerted by surfaces 124d and 124f. Thus, surfaces 124b discourage packing 123 from moving longitudinally (e.g., toward spring 140).

Figure 1:
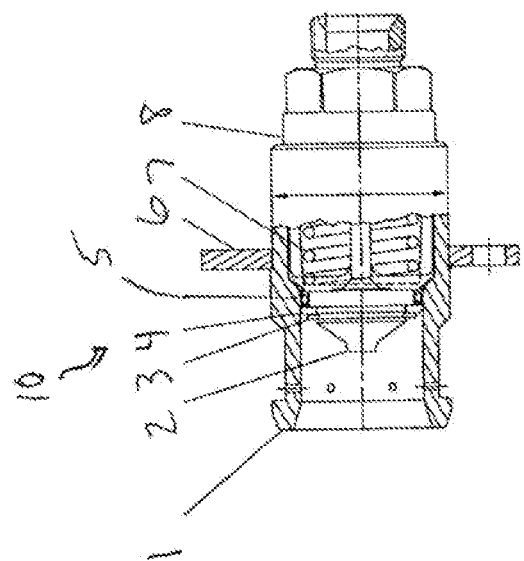
FIG. 1 is a partially cross-sectioned plan view of a prior art receptacle.
Figure 1A:
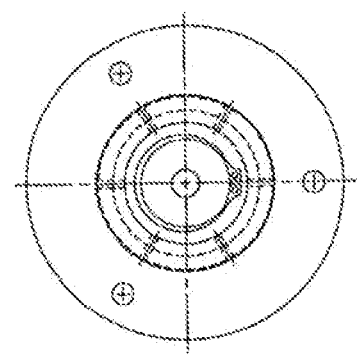
FIG. 1A is a top plan view of the prior art receptacle.

Inner packing 123 includes a cylindrical outer surface 123a, a partially conical outer surface 123b, and a ring-shaped outer surface 124b. As shown in FIG. 1, when receptacle 100 is closed, sealing surface 132 of poppet 130 bears against surfaces 123b and/or 123c of inner packing 123. As shown in FIG. 5, inner packing thus includes a first ring-shaped and annular portion 123d contacting surfaces 124c, 124d, 124e of valve seat body 120 and a second ring-shaped and annular portion 123e contacting surfaces 124b of valve seat body 120.

Figure 7:
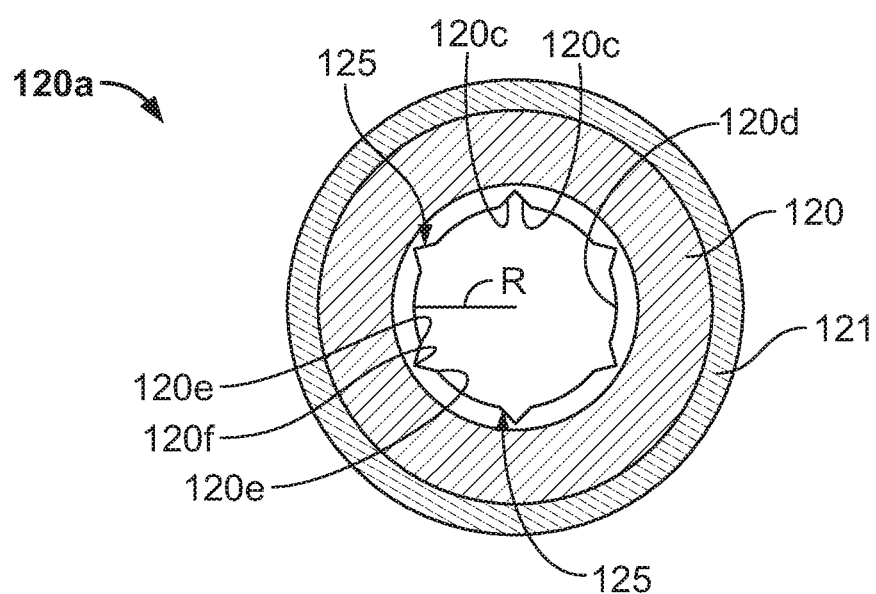
FIG. 7 is a cross sectional bottom view of an inner perimeter of the valve seat taken along the line FIG. 7-FIG. 7 of FIG. 5.

As shown in FIG. 3, and as discussed below, flats 125 (also called tool or teeth engagers) enable a user to unscrew valve seat body 120 from body 110 through inlet port 110a. As shown in FIG. 7, each flat 125 includes two flat portions or surfaces 120c intersecting 120f at an acute angle. As a result, and as shown in FIG. 6, valve seat body 120 defines a first inner perimeter 120a and a second inner perimeter 120b. First inner perimeter 120a, as shown schematically in FIG. 7, includes arced portions 120d (also called connecting portions) between flats 125. Arced portions 120d meet flats 125 at edges 120e. Edges 120e may be parallel with longitudinal axis L.

Although six flats 125 are shown, any number may be present as may be dictated by size and other engineering considerations. Flats 125 may be located at regular and equal intervals in the first inner perimeter 120a, such that each of the arced portions 120d have an identical curvature and length and each of the flats 125 have an identical length and surface area. In contrast, second inner perimeter 120b is circular. FIG. 7 shows a radius R extending between a longitudinal axis of valve seat body 120 (which may be collinear with longitudinal axis L of receptacle 100) and one of the arced portions 120d. This radius R may be a minimum inner radius of valve seat body 120, such that every other radius between the longitudinal axis of valve seat body 120 and one of the second inner surfaces of valve seat body 120 is greater than or equal to radius R.

Figure 8:
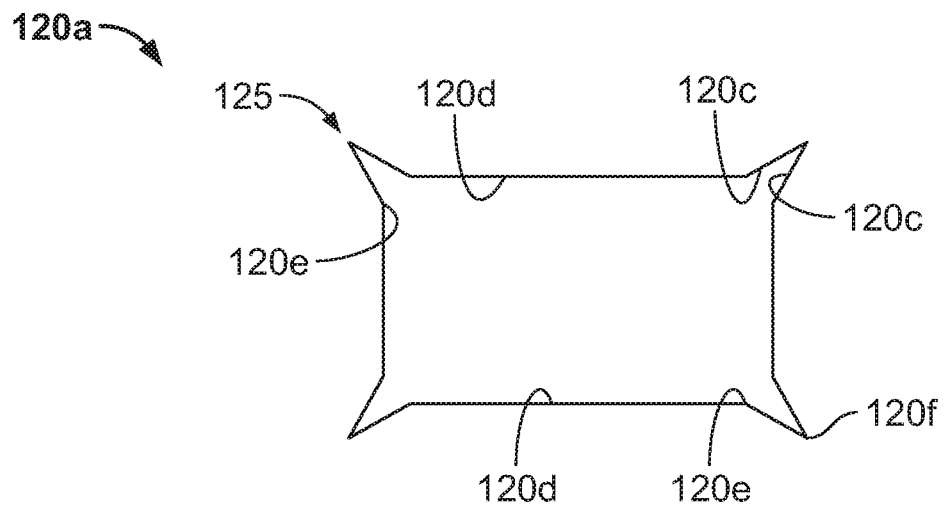
FIG. 8 is a schematic cross sectional bottom view of a second embodiment of the inner perimeter.
Figure 9:
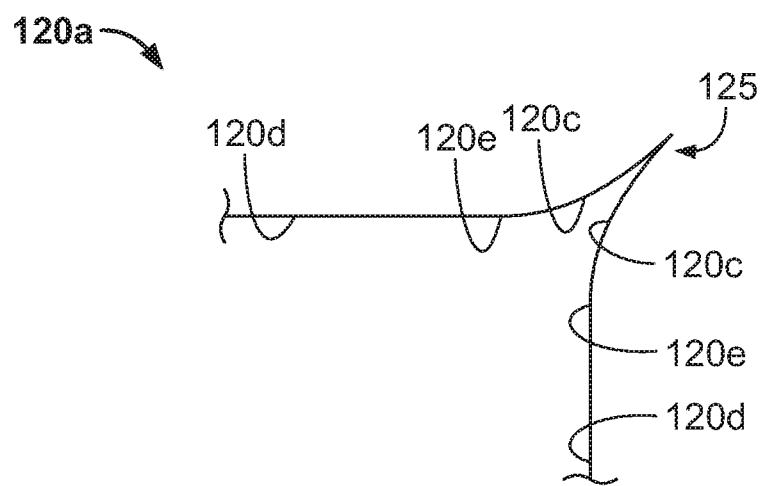
FIG. 9 is a schematic partial cross sectional bottom view of a third embodiment of the inner perimeter.

First inner perimeter 120a may have any custom shape except a circle. As schematically shown in FIG. 8, first inner perimeter 120a may be a polygon. Connecting portion 120d meet flats 120c along edges 120e. Flats 120c meet at intersections 120f. Although tool engagers 125 have been described as flats, with reference to FIG. 9, tool engagers 125 may comprise two arced surfaces 120c meeting connecting portions 120d at edges 120e.

With reference to FIGS. 2 and 3, poppet 130 includes a first cylindrical post 131, a partially conical sealing surface 132, a spring ledge 133, a stopping surface 134, and a second cylindrical post 135. First post 131 includes a circular nozzle engaging surface 131a.

As stated above, the nozzle includes an inwardly protruding member. The inwardly protruding member may include the nozzle poppet, which includes a circular receptacle engaging surface similar to, but facing, circular nozzle engaging surface 131a. As the inwardly protruding member slides into receptacle 100, the circular receptacle engaging surface of the nozzle contacts and bears against circular nozzle engaging surface 131a of receptacle 100.

The nozzle poppet pushes poppet 130 away from valve seat body 120. When poppet 130 is pushed away from valve seat body 120, poppet 130 disengages from inner packing 123, thus opening receptacle 100. Eventually, poppet 130 stops against spring retainer 150. The user continues to push the inwardly protruding member toward outlet port 110b. Because poppet 130 can no longer move further toward spring retainer 150, poppet 130 applies an opposing counter force against the nozzle poppet. This counter force causes the nozzle poppet to disengage from a nozzle sealing surface (e.g., a valve seat body or a packing), thus opening the nozzle.

At this point, fluid flows between poppet 130 and inner packing 123, past spring 140, through holes defined in spring retainer 150, and out of receptacle 100 via outlet port 110b. It should be appreciated that the order of this process may be switched, such that poppet 130 opens the nozzle poppet until the nozzle poppet reaches a stop, which then forces poppet 130 open.

Partially conical sealing surface 132 is configured to compress inner packing 123 against valve seat body 120, thus generating a fluid tight seal. Spring ledge 133 is ring-shaped and receives one end of spring 140. Spring ledge has an outer diameter exceeding an outer diameter of spring 140. Stopping surface 134 is a ring-shaped ledge and is configured to contact spring retainer 150. Second post 135 slides within a longitudinally extending void defined in spring retainer 150. Second post 135 aligns poppet 130 with respect to longitudinal axis L.

Spring 140 is helically coiled and rests between poppet 130 and spring retainer 150. Spring 140 biases poppet 130 toward compressive contact with inner packing 123. The force exerted by the nozzle poppet opposes the biasing force of spring 140, enabling poppet 130 to slide toward outlet port 110b.

Figure 11:
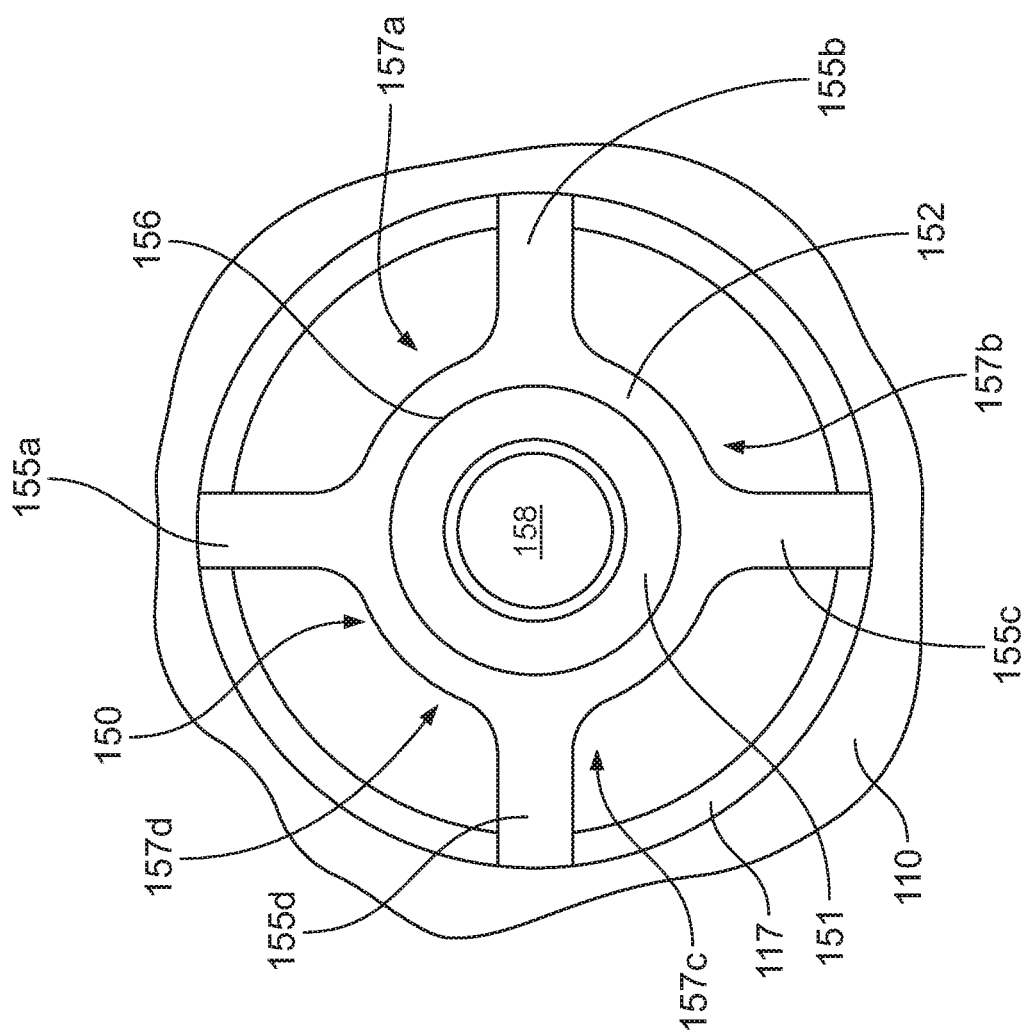
FIG. 11 is a partial cross sectional view illustrating a spring retainer in accordance with the teachings herein.

As shown more clearly in FIG. 11 spring retainer 150 defines a plurality of passages 157a, 157b, 157c, 157d with the main body 110 for enabling fluid passage toward outlet 110b. Alternatively or in addition, poppet 130 may include one or more voids defined in second post 135 for achieving the same objective. As shown in FIGS. 2, 3, and 11, the spring retainer 150 includes a ring-shaped stopping surface 151, a ring-shaped seating surface 152, and a stopping surface 153.

The stopping surface 151 arrests movement of poppet 130 toward outlet port 110b by contacting poppet stopping surface 134. One end of spring 140 bears on seating surface 152. The plurality of arms 155a-d contacts step 117 of body 110 via the stopping surface 153, thus preventing spring 140 from pushing spring retainer 150 toward outlet port 110b.

The disclosed receptacle 100 offers several advantages over existing receptacles. For example, and as shown in FIGS. 5 and 6, no surfaces of valve seat body 120 discourage outer packing 121 from moving radially outward (e.g., toward body 110). Put differently, the interference fit between outer packing 121 and valve seat body 120 squeezes outer packing 121 radially outward and toward inner surfaces 114 and 115 of body 110. As a result, outer packing 121 firmly engages inner surfaces 114 and 115 of body 110, resulting in a quality seal and a reduction in venting of fluid past valve seat body 120 into atmosphere.

Furthermore, and as shown in FIGS. 5 and 6, outer surfaces 123a, 123b, and 123c do not perpendicularly intersect the flow direction of upstream fluid in receptacle 100, or at least directly upstream fluid in receptacle 100, when receptacle 100 is open. More specifically, when receptacle 100 is open, fluid generally travels parallel to outer surface 123b of inner packing 123. This is advantageous because fluid flow through receptacle 100 may include debris (e.g., dirt). Since outer surfaces 123a, 123b, 123c do not perpendicularly intersect the flow direction of upstream fluid, debris will be carried, under its own momentum, past inner packing 123. If outer surfaces 123a, 123b, 123c did perpendicularly intersect to the flow direction of upstream fluid, then momentum of the debris could cause the debris to collide with surfaces 123a, 123b, 123c, thus impairing the seal quality between poppet 130 and inner packing 123 and increasing the venting of fluid from within receptacle 100, past valve seat body 120, and into atmosphere.

As shown in FIG. 6, debris D has a momentum vector M. Because fluid flow upstream of inner packing 123 does not perpendicularly intersect outer surfaces 123a, 123b, or 123c, the momentum vector does not intersect outer surfaces 123a, 123b, or 123c, thus reducing the possibility of collision between debris D and inner packing 123.

Additionally, the unique L-shaped geometry of inner packing 123 enables valve seat body 120 to hold inner packing 123 in place, while compressing inner packing 123 radially inward and into contact with poppet 130. As a result, venting of fluid is discouraged.

As a further example, and as shown in FIGS. 2 and 3, flats 125 are exposed via inlet port 110a. Put differently, no portion of receptacle 100 covers flats 125. As a result, a user may access and remove all components inside body 110 via inlet port 110a. More specifically, the user may engage flats 125 with a tool and twist to un-thread valve seat body 120 from body 110. Once valve seat body 120 has been unthreaded, the user may reach through port 110a and remove valve seat body 120, packings 121, 123, poppet 130, spring 140, and spring retainer 150.

The user may reinstall the internal components in a similar fashion. More specifically, the user may insert spring retainer 150 until spring retainer 150 stops against step 117 of body 110. The user may place spring around 140 around the protruding portion 154 of spring retainer 150. The user may position poppet 130 partially inside of spring retainer 150. The user may replace one or both of the packings 121, 123, and insert valve seat body 120 into body 110. With the same tool, the user may engage flats 125 to thread valve seat body 120 into body 110.

To facilitate assembly and disassembly of receptacle 100, valve seat body 120, poppet 130, spring 140, spring retainer 150, outer packing 121, and inner packing 123, upon assembly, may all have a maximum outer diameter less than or equal to a minimum inner diameter of inlet port 110a. It should be appreciated, however that upon disassembly, packings 121, 123 may expand to have a maximum outer diameter greater than the minimum inner diameter of inlet port 110a.

Furthermore, body 110 may be made of a first material (e.g., stainless steel), valve seat body 120 may be made of a second material (e.g., brass), and packings 121, 123 made me made of a third material (e.g., molded plastic). The second material may have a greater coefficient of thermal expansion than the first material. The third material may have a greater coefficient of thermal expansion than the second material. As a result, when receptacle 100 is subject to cryogenic temperatures, valve seat body 120 may shrink to a greater extent than body 110. Packings 121, 123 may shrink to a greater extent than valve seat body 120. Because outer packing 121 is radially outwardly biased by valve seat body 120, when valve seat body 120 shrinks, valve seat body 120 will continue to compress outer packing 121, thus ensuring that outer packing 121 continues to seal against body 110. As a result, venting of fluid is discouraged.

Figure 10:
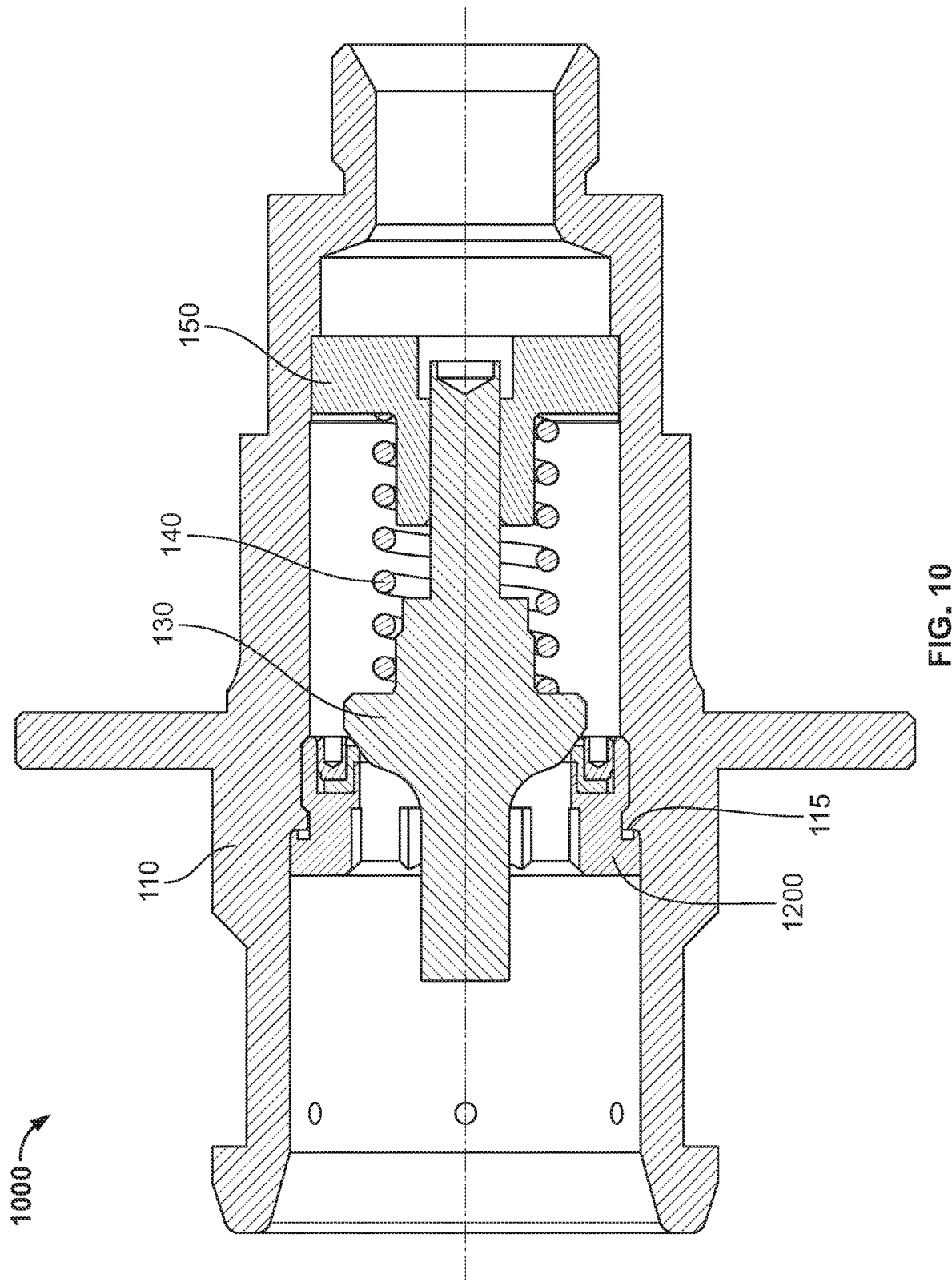
FIG. 10 is a cross sectional view of another embodiment of a receptacle in accordance with the teachings herein.

FIG. 10 is a cross sectional view of another embodiment of a receptacle 1000 in accordance with the teachings herein. The receptacle 1000 includes the main body 110, the poppet 130, the spring 140, and the spring retainer 150, all of which may be identical or substantially identical to those elements as discussed above.

Spring retainer 150 as shown in FIG. 11 is substantially identical to that shown in, e.g., FIGS. 2 and 3, and includes a plurality of arms 155a, 155b, 155c, 155d that extend radially outwardly from a flanged sleeve portion 156. The flanged sleeve portion 156 defines a circular hole 158 configured to receive the second post 135 of the poppet 130. Thus, the flanged sleeve portion 156 is slidably engaged with the second post 135. The flanged sleeve portion 156 includes the stopping surface 151 and the seating surface 152. The plurality of arms 155a-d include the stopping surface 153. Spring retainer 150 may be cylindrical, as shown in FIGS. 2, 3, and 10. In some examples, the spring retainer may be a plurality of ribs inwardly radially extending from main body 110. As such, the plurality of holes defined in spring retainer 150 may be gaps defined between adjacent ribs.

Receptacle 1000 further includes a valve seat assembly 1200. The valve seat assembly 1200 is threadably engaged inside the main body 110 to directly contact the partially conical surface 115. In other words, as the valve seat assembly 1200 threaded into the main body 110, the valve seat assembly 1200 produces a metal-to-metal interference seal with the main body 110 at the partially conical surface 115, as will be further explained in conjunction with FIGS. 12, 13A, and 13B.

FIG. 12 is a cross sectional view of the valve seat assembly 1200. As shown in the example of FIG. 12, the valve seat assembly 1200 includes a valve seat 1210, a seat disc 1230, and a seat ring 1240. The seat disc 1230 is disposed in the valve seat 1210. The seat ring 1240 is threadably engaged with the valve seat 1210 to retain the seat disc 1230 in the valve seat 1200, as will be explained in greater detail in conjunction with FIGS. 13A-15.

FIGS. 13A and 13B are front and cross sectional views, respectively of the valve seat 1210. As shown in FIGS. 12, 13A, and 13B, the valve seat 1210 includes a generally cylindrical body 1310, a sealing flange 1320, a sealing lip 1330, a first annular extension 1340, a second annular extension 1350, and a plurality of ridges 1360. In some examples, the valve seat 1210 is composed of corrosion-resistant metallic materials (e.g., bronze, brass, copper alloys, zinc alloys, stainless steel, etc.)

The sealing flange 1320 extends radially outward from the body 1310. The sealing lip 1330 extends axially away from the sealing flange 1320. The body 1310, the sealing flange 1320, and the sealing lip 1330 define an annular channel 1322. As the valve seat 1210 is threaded into the main body 110, the sealing lip 1320 contacts the partially conical surface 115 is deformed radially inwardly to partially close the annular channel 1322. In some examples, the sealing lip 1320 is elastically deformed. Thus, the sealing lip 1320 forms a metal-to-metal interference seal with the partially conical surface 115, but generally returns to its undeformed state when the valve seat 1320 is unthreaded from the main body 110.

The first and second annular extensions 1340, 1350 and the plurality of ridges 1370 extend axially away from the body 1310. The second annular extension 1350 is disposed inside the first annular extension 1340. Put differently, the first annular extension 1340 concentrically surrounds the second annular extension 1350. Thus, the first annular extension 1340 may also be referred to as an outer annular extension and the second annular extension 1350 may also be referred to as an inner annular extension. The first annular extension 1340 is longer than the second annular extension 1350. The first annular extension 1340 and a portion of the body 1310 are externally threaded. The first annular extension 1340 is additionally internally threaded. The body 1310, the first and second annular extensions 1340, 1350 and the plurality of ridges 1370 to define an annular pocket 1312. More specifically, the body 1310 and the plurality of ridges form the bottom of the annular pocket 1312 and the first and second annular extensions 1340, 1350 form the sides of the annular pocket 1312.

The body 1310 defines a first inner region 1370 of the valve seat 1210. The body 1310 and the second annular extension 1350 define a second inner region 1380 of the valve seat 1210. The first inner region 1370 and the second inner region 1380 define an inner void 1390. In operation, fluid flows through the inner void 1390.

The first inner region 1370 has a non-circular first inner perimeter 1371. The second inner region 1380 has a second inner perimeter 1381. The second inner perimeter 1381 is generally circular and is smaller than the first inner perimeter 1371.

Thus, because the second inner perimeter 1381 is smaller than the first inner perimeter 1371, the body 1310 has at least one inner ledge 1314 where the first and second inner regions 1370, 1380 meet. The first inner perimeter 1371 and the inner ledge(s) 1314 define one or more tool-engaging features 1372. It should be understood that the first inner perimeter 1371 may be any shape that permits torque to be applied to the valve seat 1210 with a corresponding tool to thread and unthread the valve seat 1210 from the main body 110 (e.g., ovate, polygonal, etc.). It should also be appreciated that the tool-engaging feature(s) 1372 extend partially through the valve seat 1210. In other words, the inner ledge(s) 1314 block a tool used to loosen and tighten the valve seat 1210 in the main body 110 from being inserted completely through the valve seat 1210. In the examples of FIGS. 12, 13A, and 13B, the first inner perimeter 1371 includes six regularly-spaced alternating arcuate sections 1374 and paired flats 1373a, 1373b. Thus, in the examples of FIGS. 12, 13A, and 13B, the tool-engaging features 1372 are defined by the paired flats 1373a, 1373b and the inner ledges 1314 and are configured to receive and engage a hexagonal tool (e.g., an Allen key, etc.).

FIG. 14 is a cross sectional view of the seat disc 1230. As shown in the example of FIG. 14, the seat disc 1230 has an body 1410, a flange 1420, and a lip 1430. The body 1410, the flange 1420, and the lip 1430 are generally annular. The flange 1420 extends generally perpendicularly radially outwardly from the body 1410. The lip 1430 extends generally perpendicularly radially inwardly from the body 1410. The lip 1430 is generally parallel with the flange 1420. The flange 1420 defines an outer shoulder 1422 with the body 1410. The lip 1430 defines an inner shoulder 1432 with the body 1410. In other words, in cross section, the flange 1420, the body 1410, and the lip 1430 form a zigzag shape. As shown in FIG. 12, the seat disc 1230 is configured to be inserted into the annular pocket 1312 such that the flange 1420 contacts the body 1310 and the ridges 1312 of the valve seat 1210, the body 1410 contacts the second annular extension 1350, and the lip 1430 catches the second annular extension 1350 at the inner shoulder 1432. In some examples, the seat disc 1230 is made of a polymer material (e.g., plastic, ultra-high molecular weight polyethylene, nylon, polytetrafluoroethylene, etc.). As shown in FIG. 11, the poppet 130 contacts the lip 1430 to close (e.g., stop fluid flow) the receptacle 1000, thus forming a fluid-tight seal.

Figure 15B:
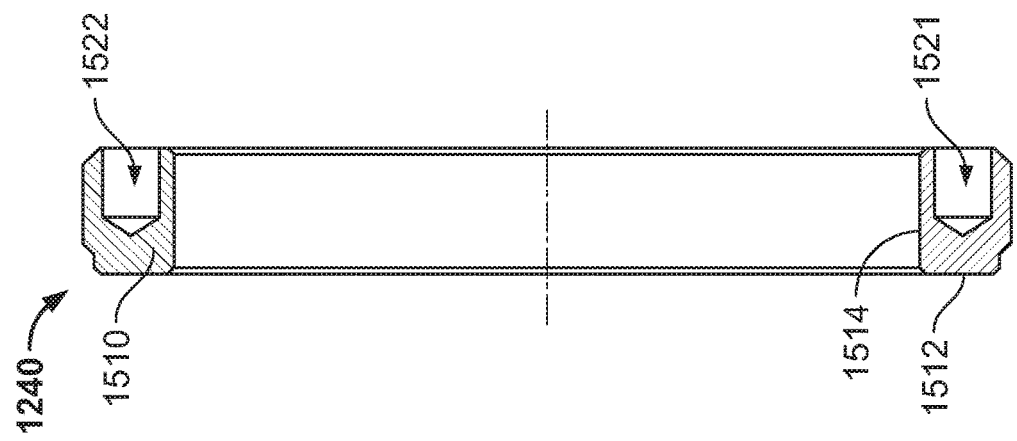
FIG. 15B is a cross sectional view of the seat ring of FIG. 12.
Figure 15A:
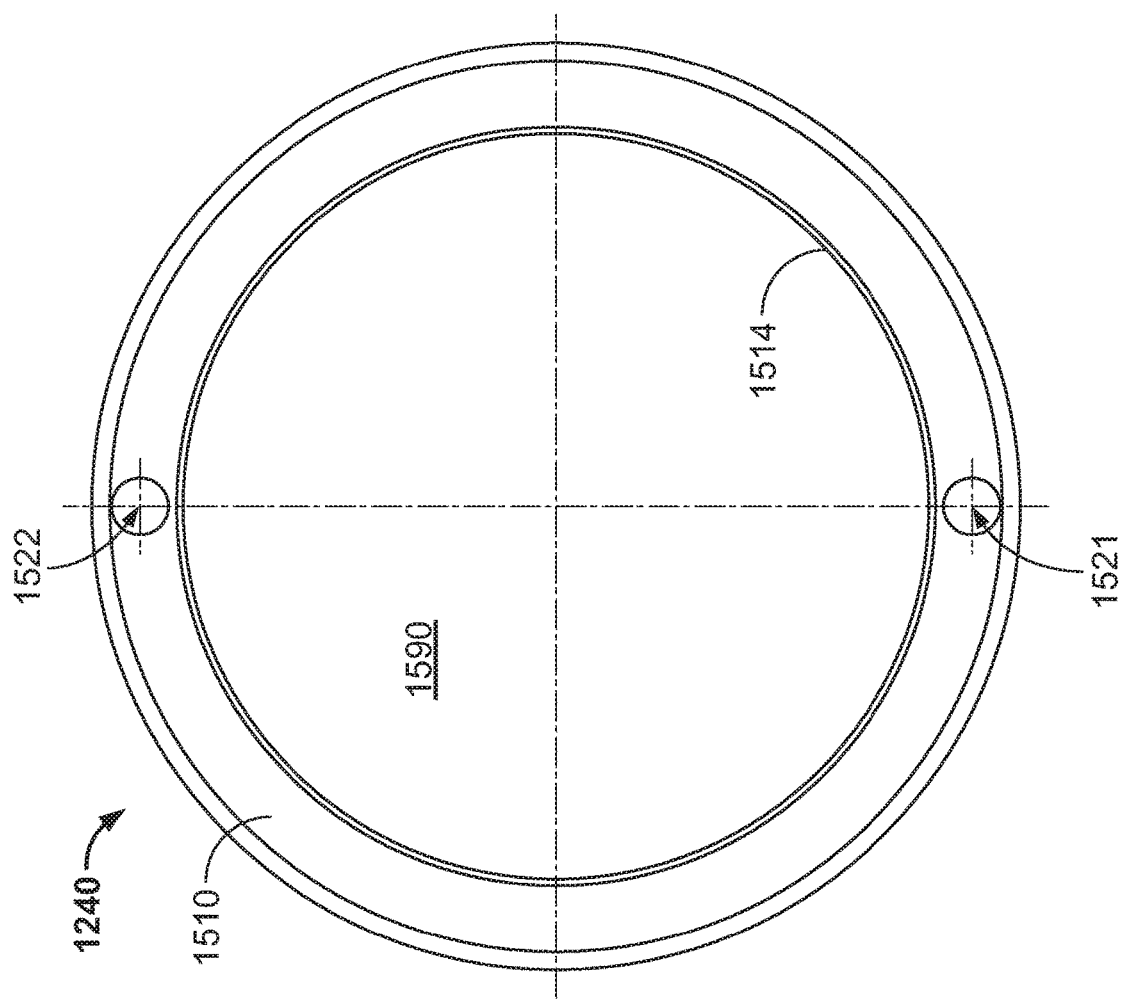
FIG. 15A is a rear view of the seat ring of FIG. 12.

FIGS. 15A and 15B are rear and cross sectional views, respectively, of the seat ring 1240. The seat ring 1240 includes a generally cylindrical body 1510. The body 1510 defines an inner void 1590, a first tool pocket 1521, and a second tool pocket 1522. The first and second tool pockets 1521, 1522 are generally defined in the body 1510 opposite one another. The body 1510 is externally threaded and has a bottom surface 1512 and an inner surface 1514. Looking at FIGS. 12, 13B, and 15B, the seat ring 1240 is configured to threadably engage with the first annular extension 1340. More specifically, the seat ring 1240 is threaded into the first annular extension 1340. Once the seat disc 1230 is placed in the annular pocket 1312, as the seat ring 1240 is threaded into the first annular extension 1340, the inner surface 1514 contacts the body 1410 and the bottom surface 1512 contacts the flange 1420. When the seat ring 1240 is tightened, the seat disc 1230 is forced against the ridges 1312 such that the ridges 1312 dig into the seat disc 1230. Thus, the seat disc 1230 is secured in the valve seat 1210 and rotation of the seat disc 1230 is substantially prevented. It should be appreciated that the first and second tool pockets 1521, 1522 are configured to receive tool(s) (e.g., tips of a needle-nose pliers, a two-tipped fork, rods, Allen keys, etc.) to apply torque to the seat ring 1240 to thread and unthread the seat ring 1240 relative to the valve seat 1210. In some examples, the seat ring 1240 is composed of corrosion-resistant metallic materials.

It should be appreciated that the poppet 130 does not contact the valve seat 1210 or the seat ring 1240. Thus, because the poppet 130 contacts the polymer surfaces of the seat disc 1230 instead of the metallic surfaces of the valve seat 1210 or the seat ring 1240 to close the receptacle 1000, wear on and/or scratch formation in the poppet 130 is reduced. Thus, leakage from the receptacle 1000 is substantially reduced.

The above-discussed advantages are not the only advantages of the disclosed embodiments. Other advantages should be apparent after reading the above detailed description.

It should thus be appreciated that the present application discloses a receptacle for conveying fluid. The receptacle may include a body, a valve seat assembly, a poppet, a spring retainer, and a spring. The body may define an inlet port and an outlet port. The valve seat assembly may comprise a valve seat body and a packing. The valve seat body may be disposed in and secured to the body.

The valve seat body may include: a first end portion, an opposing second end portion. The first end portion may include a plurality of first inner surfaces defining an inner annular groove. The valve seat body may include a plurality of second inner surfaces defining an inner void and comprising one or more arced surfaces and one or more flats. The poppet may be disposed in the body.

The spring retainer may be disposed in, and fixed with respect to, the body. The spring may be disposed between the poppet and the spring retainer. The spring may bias the poppet toward the first position. The packing may be disposed in the inner annular groove. The poppet may be moveable between a first position where the poppet is engaged to the packing and a second position where the poppet is disengaged from the packing.

At least some of the second inner surfaces may define a first inner perimeter of the inner void and at least some of the second inner surfaces may define a second inner perimeter of the inner void. Each of the first and second inner perimeters may occupy planes perpendicular to a reference longitudinal axis of the receptacle, and each of the first and second inner perimeters may have different geometry.

The first inner perimeter may comprise a plurality of arced portions corresponding to the one or more arced surfaces and a plurality of flat portions corresponding to the one or more flats.

All of the one or more arced surfaces and all of the one or more flats may define the first inner perimeter, and all of the one or more arced surfaces, but none of the one or more flats, may define the second inner perimeter.

The first perimeter may be disposed closer to the inlet port than the second perimeter.

Each of the flats may comprise two of the plurality of flat portions. The two flat portions of each flat may intersect and each of the intersections may be further from the longitudinal axis of the receptacle than each of the plurality of arced portions. The second inner perimeter may be a circle.

The valve seat body may define a reference longitudinal axis and a plurality of radii extending between the longitudinal axis and the plurality of second inner surfaces.

A first radius between the longitudinal axis and one of the one or more arced surfaces may be a minimum of the plurality of radii, such that every other radius between the longitudinal axis of the valve seat body and one of the second inner surfaces of the valve seat body is greater than or equal to the first radius.

Each of the valve seat body, the poppet, the spring retainer, the packing, and the spring may have a maximum outer diameter less than or equal to a minimum inner diameter of the inlet port.

Each of the valve seat body, poppet, spring retainer, spring, and packing may be removable from the body via the inlet port without disassembling the body and without damaging or deforming any portion of each of the body, the valve seat body, the poppet, the spring retainer, the spring, and the packing.

It should thus be appreciated that the present application discloses a receptacle for conveying fluid. The receptacle may comprise a body, a valve seat assembly, a poppet, a spring retainer, and a spring. The valve seat assembly may comprise a valve seat body, an outer packing, and an inner packing. The body may define an inlet port and an outlet port.

The valve seat body may be disposed in and secured to the body. The valve seat body may comprise: a first end portion and an opposing second end portion. The first end portion may comprise a plurality of first inner surfaces defining an inner annular groove. The plurality of first inner surfaces may comprise a first wall, a second wall perpendicularly intersecting one end of the first wall, and a third wall perpendicularly intersecting an opposing end of the first wall.

The opposing second end portion may define an outer annular groove. The valve seat body may comprise one or more second inner surfaces defining an inner void. The poppet may be disposed in the body; The spring retainer may be disposed in, and fixed with respect to, the body. The spring may be disposed between the poppet and the spring retainer. The spring may bias the poppet toward the first position.

The outer packing may be disposed in the outer annular groove. The outer packing may contact one or more inner surfaces of the body and one or more outer surfaces of the valve seat body. The inner packing may be disposed in the inner annular groove.

The poppet may be moveable between a first position where the poppet is engaged to the inner packing and a second position where the poppet is disengaged from the inner packing. The inner packing may comprise a first ring-shaped and annular portion contacting the first wall, the second wall, and the third wall.

The plurality of first inner surfaces may comprise a fourth wall, a fifth wall, and a sixth wall. The fifth wall may perpendicularly intersect one end of the fourth wall and the sixth wall may perpendicularly intersect another end of the fourth wall.

A reference segment tangent to the fourth wall may perpendicularly intersect a reference plane coplanar with the first wall. The first, second, third, fourth, fifth, and sixth walls may be annular and in contact with the inner packing. The plurality of first inner surfaces may comprise a seventh wall and the inner packing contacts the seventh wall.

The inner packing may comprise an inwardly facing portion. The inwardly facing portion may comprise three different packing surfaces. None of the three different packing surfaces may contact the valve seat body. The three different packing surfaces may comprise a first cylindrical surface, a second partially conical surface, and a third cylindrical surface.

It should thus be appreciated that the present application discloses a receptacle for conveying fluid. The receptacle may comprise: a body, a valve assembly, a poppet, a spring retainer, and a spring. The valve seat assembly may comprise a valve seat body, an outer packing, and an inner packing. The body may define an inlet port and an outlet port.

The valve seat body may be disposed in and secured to the body. The valve seat body may comprise: a first end portion and an opposing second end portion. The first end portion may comprise a plurality of first inner surfaces defining an inner annular groove. The plurality of first inner surfaces may comprise four different first inner surfaces. The opposing second end portion may define an outer annular groove. The valve seat body may comprise one or more second inner surfaces defining an inner void.

The poppet may be disposed in the body. The spring retainer may be disposed in and fixed with respect to the body. The spring may be disposed between the poppet and the spring retainer. The spring may bias the poppet toward the first position.

The outer packing may be disposed in the outer annular groove. The outer packing may contact one or more inner surfaces of the body and one or more outer surfaces of the valve seat body. The inner packing may be disposed in the inner annular groove.

The poppet may be moveable between a first position where the poppet is engaged to the inner packing and a second position where the poppet is disengaged from the inner packing. The inner packing may contact each of the four different first inner surfaces.

The plurality of first inner surfaces may comprise six different first inner surfaces. The six different first inner surfaces may comprise the four different first inner surfaces. The inner packing may contact each of the six different first inner surfaces.

The poppet may comprise a flat upper surface. The flat upper surface may be closer to the inlet port than any other surfaces of the poppet. The valve seat body may be disposed closer to the inlet port than the spring retainer.

The spring retainer may comprise one or more stopping surfaces facing the inlet port. The poppet may engage with the one or more stopping surfaces when the poppet is in the second position. The poppet may be disengaged from the one or more stopping surfaces when the poppet is in the first position.

The body may comprise an inner ledge. The spring retainer may be fixed with respect to the body by virtue of being compressed by the spring against the inner ledge.

Each of the valve seat body, the poppet, the spring retainer, spring, the outer packing, and the inner packing may have a maximum outer diameter less than or equal to a minimum inner diameter of the inlet port.

Each of the valve seat body, poppet, spring retainer, spring, outer packing, and inner packing may be removable from the body via the inlet port without disassembling the body and without damaging or deforming any portion of each of the body, the valve seat body, the poppet, the spring retainer, the spring, the outer packing, and the inner packing.

The one or more inner surfaces of the body contacting the outer packing may comprise a cylindrical inner surface and a partially conical inner surface.

It should thus be appreciated that the present application discloses a receptacle for conveying fluid. The receptacle may comprise a body, a valve seat assembly, a poppet, a spring retainer, and a spring. The valve seat assembly may comprise a valve seat body, an outer packing, and an inner packing. The body may define an inlet port and an outlet port.

The valve seat body may be disposed in and secured to the body. The valve seat body may comprise a first end portion and an opposing second end portion. The first end portion may define an inner annular groove and the second end portion may define an outer annular groove. The valve seat body may comprise one or more inner surfaces defining an inner void.

The poppet may be disposed in the body. The spring retainer may be disposed in, and fixed with respect to, the body. The spring may be disposed between the poppet and the spring retainer. The spring may bias the poppet toward the first position.

The outer packing may be disposed in the outer annular groove. The outer packing may contact one or more inner surfaces of the body and one or more outer surfaces of the valve seat body. The inner packing may be disposed in the inner annular groove.

The poppet may be moveable between a first position where the poppet is engaged to the inner packing and a second position where the poppet is disengaged from the inner packing. The inner packing may have an L-shaped cross section.

It should thus be appreciated that the present application discloses a receptacle for conveying fluid. The receptacle may comprise a body, a valve seat assembly, a poppet, a spring retainer, and a spring. The valve seat assembly may comprise a valve seat body, an outer packing, and an inner packing. The body may define an inlet port and an outlet port.

The valve seat body may be disposed in and secured to the body. The valve seat body may comprise: a first end portion and an opposing second end portion. The first end portion may comprise a plurality of first inner surfaces defining an inner annular groove. The plurality of first inner surfaces may comprise four different first inner surfaces. The four different first inner surfaces may comprise a first wall, a second wall perpendicularly intersecting one end of the first wall, and a third wall perpendicularly intersecting an opposing end of the first wall.

The opposing second end portion may define an outer annular groove. The valve seat body may comprise a plurality of second inner surfaces defining an inner void. The second inner surfaces may comprise one or more arced surfaces and one or more flats.

The poppet may be disposed in the body. The spring retainer may be disposed in and fixed with respect to the body. The spring may be disposed between the poppet and the spring retainer.

The outer packing may be disposed in the outer annular groove. The outer packing may contact one or more inner surfaces of the body and one or more outer surfaces of the valve seat body.

The inner packing may be disposed in the inner annular groove. The inner packing may comprise an L-shaped cross section. The poppet may be moveable between a first position where the poppet is engaged to the inner packing and a second position where the poppet is disengaged from the inner packing. The inner packing may comprise a first ring-shaped and annular portion contacting the first wall, the second wall, and the third wall. The inner packing may contact each of the four different first inner surfaces.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

It should be appreciated that the term "diameter" when used in the claims, does not necessarily mean that the feature having the diameter is circular. Instead, the term diameter should be understood to at least encompass a maximum straight distance between two opposing outer surfaces of the feature. For example, a square could have an outer diameter extending between opposing corners.

It should be appreciated that when the claims recite features that are fixed or connected to each other, such features may be integral or non-integral.

What is claimed is:

1. A receptacle comprising:
  a main body defining an inlet and an outlet;
  a spring retainer disposed in the main body;
  a valve seat disposed in the main body;
  a poppet configured to slide between a closed position and an open position, wherein the poppet is slidably engaged with the spring retainer between the closed position and the open position and is engaged with the valve seat in the closed position; and
  a spring engaged with the spring retainer and the poppet to bias the poppet to engage the valve seat in the closed position,
  wherein, when disposed in the main body, the spring retainer is pressed in place against the main body by the spring,
  wherein the valve seat is configured to confine the spring retainer, the poppet, and the spring within the main body, and
  wherein the spring retainer, the valve seat, the poppet, and the spring are removable from the main body via the inlet without disassembling the main body.

2. The receptacle of claim 1, wherein the valve seat is removable from the main body via the inlet to enable the spring retainer, the poppet, and the spring to be removed from the main body via the inlet.

3. The receptacle of claim 1, wherein the valve seat comprises outer threads that are configured to be received by inner threads of the main body to enable the valve seat to be fixed to the main body when disposed in the main body.

4. The receptacle of claim 3, wherein the main body defines an inner void configured to receive a tool for unthreading the valve seat from the main body.

5. The receptacle of claim 3, wherein the valve seat include flats configured to receive a tool for unthreading the valve seat from the main body, wherein the flats are exposed to the inlet when the valve seat is disposed in the main body to enable the tool to extend through the inlet to engage the flats.

6. The receptacle of claim 5, wherein the valve seat comprises a body and a seat disc, wherein the seat disc is coupled to a side of the main body opposite the flats, wherein the seat disc is configured to engage the poppet in the closed position.

7. A receptacle comprising:
  a main body defining an inlet and an outlet;
  a spring retainer disposed in the main body;
  a valve seat disposed in the main body;
  a poppet configured to slide between a closed position and an open position, wherein the poppet is slidably engaged with the spring retainer between the closed position and the open position and is engaged with the valve seat in the closed position, wherein the poppet includes a first post and a second post opposite the first post, and wherein, when the poppet is disposed in the main body, the first post is configured to slide through the valve seat and the second post is configured to slide through the spring retainer; and
  a spring engaged with the spring retainer and the poppet to bias the poppet to engage the valve seat in the closed position,
  wherein the valve seat is configured to confine the spring retainer, the poppet, and the spring within the main body, and
  wherein the spring retainer, the valve seat, the poppet, and the spring are removable from the main body via the inlet without disassembling the main body.

8. The receptacle of claim 7, wherein the spring retainer defines a first stopping surface and the poppet defines a second stopping surface, wherein the first stopping surface is configured to engage the second stopping surface to limit movement of the poppet within the main body.

9. The receptacle of claim 7, wherein, when disposed in the main body, the spring retainer is pressed in place against the main body by the spring.

10. A receptacle comprising:
  a main body configured to convey fluid, the main body having an inner surface having a plurality of inner diameters, the inner surface comprising:
    a first step transitioning between a first inner diameter and a second inner diameter, the first inner diameter being less than the second inner diameter; and
    a seating surface transitioning between a third inner diameter and a fourth inner diameter, the third inner diameter being less than the fourth inner diameter;
  a spring retainer configured to abut the first step when the spring retainer is secured within the main body;
  a valve seat configured to abut the seating surface when secured within the main body;
  a poppet configured to slide between a closed position and an open position, wherein the poppet is slidably engaged with the spring retainer between the closed position and the open position and is engaged with the valve seat in the closed position; and
  a spring configured to extend between the poppet and the spring retainer to press the spring retainer against the first step and to bias the poppet to engage the valve seat in the closed position.

11. The receptacle of claim 10, wherein the main body defines an inlet and an outlet opposite the inlet, wherein the spring retainer, the valve seat, the poppet, and the spring are configured to be removed from the main body via the inlet.

12. The receptacle of claim 11, wherein the seating surface is positioned between the inlet and the first step.

13. The receptacle of claim 12, wherein the third inner diameter of the seating surface is greater than or equal to the second inner diameter of the main body.

14. The receptacle of claim 13, wherein the inlet has a fifth inner diameter, and wherein the fifth inner diameter of the inlet is greater than or equal to the fourth inner diameter of the seating surface.

15. The receptacle of claim 10, wherein the main body includes internal threads adjacent the seating surface.

16. The receptacle of claim 15, wherein the valve seat includes external threads configured to threadably couple to the internal threads of the main body to secure the valve seat to the main body.

17. The receptacle of claim 16, wherein the seating surface is positioned between an inlet and the internal threads of the main body.

18. The receptacle of claim 16, wherein the valve seat includes a first O-ring configured to sealingly engage the seating surface when the valve seat is secured to the main body.

19. The receptacle of claim 18, wherein the valve seat includes a second O-ring configured to engage the poppet, wherein the first O-ring is adjacent a first side of the valve seat and the second O-ring is adjacent a second side of the valve seat opposite the first side.

* * * * *